Nov. 6, 1934.                C. R. WEISS                1,979,592
                             CHAIN LINK
                          Filed Dec. 26, 1931
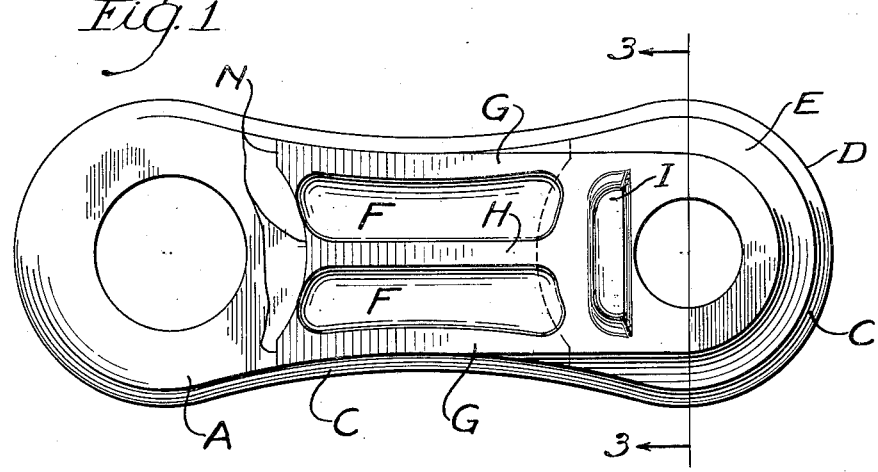
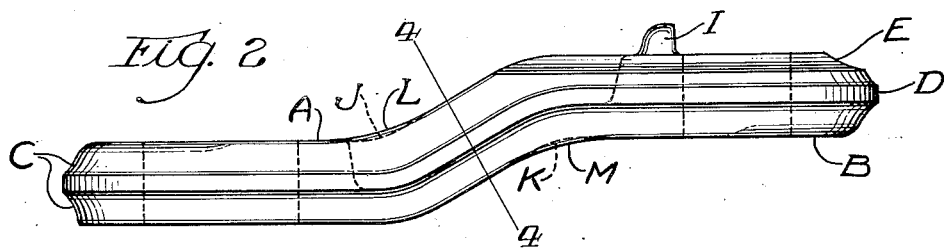
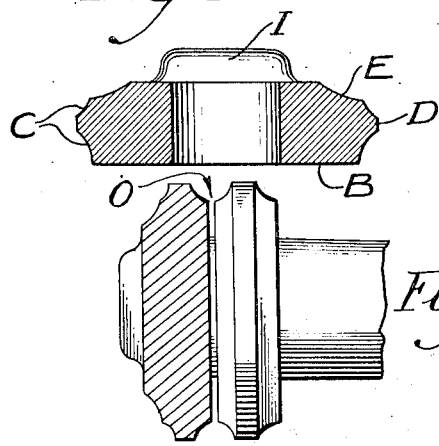
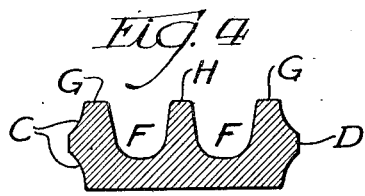
Inventor
Charles R. Weiss
By Allyn Harris   Atty.

Patented Nov. 6, 1934

1,979,592

UNITED STATES PATENT OFFICE 1,979,592

CHAIN LINK

Charles R. Weiss, Indianapolis, Ind., assignor to Link Belt Company, a corporation of Illinois Application December 26, 1931, Serial No. 583,358

3 Claims. (Cl. 59—84)

This invention relates to an improved chain link construction.

The principal object of the invention is to achieve an improved weight-strength ratio in chain link construction.

This object is realized in the construction illustrated in the accompanying drawing, wherein, Figure 1 is a top plan view of a chain link according to one form of the invention, Figure 2 is an edge view of the link shown in Figure 1, Figure 3 is a sectional view taken along line 3—3 of Figure 1, Figure 4 is a sectional view taken along line 4—4 of Figure 2, Figure 5 is a detail view illustrating the relation of the overlapping ends of adjacent links.

The improved chain link is the result of efforts looking toward development of a more efficient ratio between weight and strength. A very substantial advantage has been achieved in this regard by the features of construction and design hereinafter described.

Referring to Figures 1 and 2, the general shape of the link will be readily observed. In an assembled chain made up of links of this character, the surface A of one link will be engaged by the surface B of a second link, and similarly, surface B of the one link will be engaged by surface A of a third link, and so on throughout the chain, as will be readily understood. The surfaces A and B are smooth finished circular areas, as shown in Figure 1, for lateral bearing engagement with corresponding surfaces of adjacent links.

The link is relieved of considerable weight by grooves C extending entirely around the edge thereof, leaving an intermediate endless strengthening rib D. A further weight reduction is effected by the relief E formed on the end opposite surface B. A still further and very substantial weight reduction is effected by the formation of relatively deep recesses F in the outer side of the link and about midway of its length. The formation of these recesses F leaves two marginal ribs G and an intermediate rib H, all designed to provide maximum strength. A locking lug I is formed on the outer surface of one end of the link for cooperation with the flat head of a pivot pin.

In order to further strengthen the link, the normal curves at the points of offset, indicated by dotted lines J and K, are filled in, as shown by solid lines L and M, thus providing abnormal thickness of metal across the bend. The thickening of the link starts at the boundary of the circular flat areas A and B, for example at the points indicated at N. On the outer surface of the link the thickening affects primarily the strengthening ribs G and H. This design has been found to afford considerable added strength to the link, while the weight is increased but very little.

Referring to Figure 5, it will be observed that at the overlapping ends of adjacent links the grooves C of the respective links cooperate to form a channel O which serves the very useful purpose of retaining lubricant placed therein and conducting same to the bearing surfaces A and B of the respective links and to the articulation points of the links. The lubrication of conventional forms of chain links has presented a rather serious problem which is entirely obviated by the present improved chain design.

Having described my invention and pointed out the manner in which its objects are achieved, what I claim is:

1. A chain link side bar formed to provide relatively offset end portions disposed in substantially parallel planes, and an intermediate connecting portion, said bar being of substantially uniform thickness throughout its length except at the zones of juncture of said intermediate portion with said offset portions, at which zones the thickness of said bar is substantially increased to provide added strength, said intermediate portion having formed in one surface thereof two elongated depressions of substantial depth, with an intermediate strengthening rib, said bar having endless marginal grooves on both surfaces thereof, and another intermediate strengthening rib extending entirely around the edge of said bar.

2. A chain link side bar having formed in one surface thereof two elongated depressions of substantial depth with an intermediate strengthening rib, said side bar further having endless marginal grooves on both surfaces thereof constructed and arranged to reduce the weight of the bar throughout its length and to assist in feeding lubricant between the faces of contacting bars and to pivot pins when the link is assembled in a chain, and another intermediate strengthening rib extending entirely around the edge of said bar between said marginal grooves.

3. A chain link side bar formed to provide relatively offset end portions disposed in substantially parallel planes, and an intermediate connecting portion, said intermediate portion having formed in one surface thereof two elongated depressions of substantial depth with an intermediate strengthening rib, said bar having endless marginal grooves on both surfaces thereof constructed and arranged to reduce the weight of the bar throughout its length and to assist in feeding lubricant between the faces of contacting bars and to pivot pins when the link is assembled in a chain, and another intermediate strengthening rib extending entirely around the edge of said bar.

CHARLES R. WEISS.